United States Patent
Banvait (10) Patent No.: US 9,803,391 B2
(45) Date of Patent: Oct. 31, 2017

(54) VEHICLE UNLOCKING SYSTEMS AND METHODS

(71) Applicant: Ford Global Technologies, LLC, Dearborn, MI (US)

(72) Inventor: Harpreetsingh Banvait, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 14/852,063

(22) Filed: Sep. 11, 2015

(65) Prior Publication Data

US 2017/0074000 A1    Mar. 16, 2017

(51) Int. Cl.
| | |
|---|---|
| *E05B 43/00* | (2006.01) |
| *B60R 25/33* | (2013.01) |
| *E05B 81/16* | (2014.01) |
| *B60R 25/01* | (2013.01) |
| *E05B 81/04* | (2014.01) |
| *E05B 81/64* | (2014.01) |
| *E05B 47/00* | (2006.01) |

(52) U.S. Cl.
CPC ............ *E05B 43/005* (2013.01); *B60R 25/01* (2013.01); *B60R 25/33* (2013.01); *E05B 81/04* (2013.01); *E05B 81/16* (2013.01); *E05B 81/64* (2013.01); *E05B 2047/0048* (2013.01); *E05B 2047/0067* (2013.01); *E05B 2047/0072* (2013.01)

(58) Field of Classification Search
CPC ........ E05B 43/005; E05B 81/04; E05B 81/16; E05B 81/64; B60R 25/01; B60R 25/33
USPC ....................................................... 340/5.72
See application file for complete search history.

(56) References Cited

U.S. PATENT DOCUMENTS

| | | | | |
|---|---|---|---|---|
| 4,637,237 | A * | 1/1987 | Witkoski | ................ E05B 37/16 70/129 |
| 6,906,612 | B2 | 6/2005 | Ghabra | |
| 7,612,649 | B2 | 11/2009 | Kumazaki | |
| 7,786,864 | B1 | 8/2010 | Shostak | |
| 7,868,735 | B2 | 1/2011 | Nakashima | |
| 2001/0054952 | A1* | 12/2001 | Desai | ...................... E05B 77/48 340/5.72 |
| 2007/0038344 | A1* | 2/2007 | Oota | ................... B60R 25/2009 701/49 |
| 2008/0120366 | A1* | 5/2008 | Donovan | .............. H04L 67/125 709/203 |
| 2013/0200999 | A1* | 8/2013 | Spodak | .................... G05B 1/01 340/5.65 |

(Continued)

OTHER PUBLICATIONS

Mobiado CPT002 Aston Martin concept promises transparent touchscreen Android Community, Mar. 25, 2011, http://androidcommunity.com/mobiadocpt002astonmartinconceptpromisestran.

*Primary Examiner* — Yong Hang Jiang
(74) *Attorney, Agent, or Firm* — David R. Stevens; Stevens Law Group (57) ABSTRACT

Example vehicle unlocking systems and methods are described. In one implementation, a method detects a vehicle access device within a predetermined distance of a vehicle and determines a geographic location of the vehicle. The method also detects a time of day and determines previous door unlocking behavior associated with the vehicle access device. A vehicle access point is selected for unlocking based on the geographic location, time of day, and previous door unlocking behavior.

16 Claims, 5 Drawing Sheets

(56) References Cited

U.S. PATENT DOCUMENTS

2013/0275008 A1 10/2013 Breed
2014/0152422 A1 6/2014 Breed

\* cited by examiner

| Geographic Location | 1234 Main Street, Sunnyvale, CA |
|---|---|
| Day of Week | Tuesday |
| Time of Day | 5:24pm |
| Ambient Light | Daylight |
| Precipitation | None |
| Temperature | 64°F |

| Geographic Location | 487 N. Post Road, San Jose, CA |
|---|---|
| Day of Week | Saturday |
| Time of Day | 10:16am |
| Ambient Light | unknown |
| Precipitation | unknown |
| Temperature | 64°F |

VEHICLE UNLOCKING SYSTEMS AND METHODS

TECHNICAL FIELD

The present disclosure relates to systems and methods that automatically unlock one or more vehicle doors upon detection of a vehicle access device near the vehicle.

BACKGROUND

Most vehicles offer keyless entry systems controlled, for example, by a user via a key fob or similar device. Although these keyless entry systems are convenient for users, they still require the user to remove the key fob from a pocket or purse and activate the appropriate button to unlock a door or trunk of the vehicle. Many users have common routines related to unlocking vehicle doors. For example, after grocery shopping, a user may unlock a trunk or tailgate of a vehicle. After work, they may regularly unlock a driver's door and a passenger door. For each of these routines or patterns, the user must remove the key fob from their pocket or purse and unlock the same door or trunk each time.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein determine whether to unlock a car door (or trunk), and which doors to unlock, based on various factors, such as the geographic location of the vehicle, the time of day, the day of the week, and a user's previous door unlocking behavior. An unlocking algorithm learns a user's door unlocking behavior based on the various factors and predicts a user's intent when approaching a vehicle. Based on the user's intent, the system describes methods to automatically unlock the appropriate doors, trunk or tailgate, thereby eliminating the need for the user to locate a key fob or other unlocking device. The user can define certain override conditions that prevent the system from automatically unlocking vehicle doors in certain situations.

Particular examples discussed herein refer to unlocking vehicle doors, trunks, and tailgates. However, the described systems and methods are applicable to automatically unlock any vehicle access point, such as a front door, back door, trunk, tailgate, sliding door, hatch, hood, gas tank refill door, and the like. Any reference herein to unlocking a "door" (or "vehicle door") includes unlocking any type of lock mechanism associated with any type of vehicle access point.

In some situations, after unlocking a vehicle access point, the described systems may also open the access point. For example, in vehicles with self-powered doors, trunks or tailgates, the system may unlock a door, trunk or tailgate and automatically open the unlocked door, trunk or tailgate for the benefit of the user. For example, if a user is returning to their vehicle after shopping for groceries, the described systems and methods may automatically unlock the vehicle's trunk and open the trunk for the user.

Figure 1:
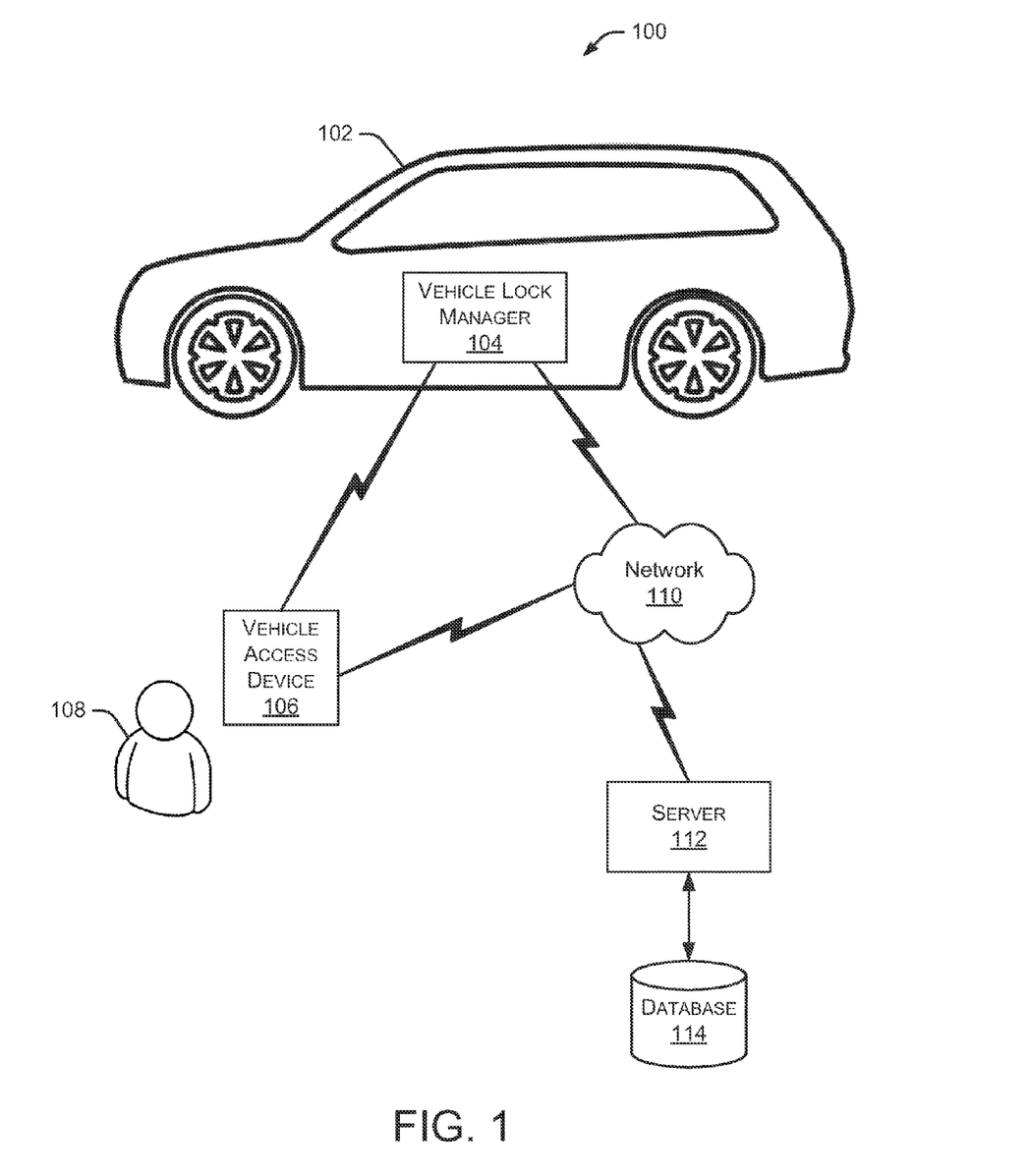
FIG. 1 is a block diagram depicting an example environment capable of implementing the systems and methods discussed herein.

FIG. 1 is a block diagram depicting an example environment 100 capable of implementing the systems and methods discussed herein. A vehicle 102 includes a vehicle lock manager 104 that controls the locking and unlocking of any number of lock mechanisms in vehicle 102, such as door locks, trunk locks, and tailgate locks. Vehicle 102 may be any type of car, truck, van, bus, SUV (sport utility vehicle) or other vehicle having one or more lock mechanisms. Vehicle lock manager 104 communicates with a vehicle access device 106 to detect the presence of a user 108 within a particular distance of vehicle 102. User 108 is, for example, a driver or passenger of vehicle 102. In some embodiments, vehicle lock manager 104 detects vehicle access device 106 when it is within a predetermined distance of vehicle 102, thereby indicating that user 108 is approaching vehicle 102 and intends to gain access the vehicle. In some implementations, vehicle lock manager 104 can detect the direction from which user 108 is approaching vehicle 102 (e.g., approaching toward the back of the vehicle, the front of the vehicle, the driver's side of the vehicle or the passenger's side of the vehicle). Vehicle access device 106 is any portable device capable of communicating with vehicle lock manager 104, such as a key fob, a smartphone, a portable computing device, a tablet computer, a smart watch, smart glasses or other wearable devices. In some embodiments, vehicle access device 106 communicates with vehicle lock manager 104 using the Bluetooth wireless communication system. In some embodiments, the Bluetooth wireless communication system allows vehicle access device 106 to determine its location and distance from the vehicle based on the triangulation of multiple Bluetooth signals. Alternatively, vehicle access device 106 can use WiFi or other wireless communication protocols to determine the location of vehicle access device 106 and its distance from the vehicle.

Vehicle 102 may include any number of sensors (not shown) to sense environmental conditions, people approaching vehicle 102, and the like. The data acquired by the sensors is provided to vehicle lock manager 104 and may be used in determining whether to unlock one or more vehicle doors. For example, a sensor on vehicle 102 may sense a person approaching vehicle 102 and the direction from which they are approaching vehicle 102. This information may be used instead of, or in addition to, information received from vehicle access device 106. Other sensors on vehicle 102 may sense environmental conditions, such as an ambient light level, a current temperature (inside and/or outside vehicle 102), an existence of precipitation in the air, and so forth.

Vehicle lock manager 104 may periodically communicate with a data communication network 110, such as the Internet or other network. For example, vehicle lock manager 104 may communicate with a server 112 via network 110. Server 112 can access data from a database 114, which includes user profile information, previous user door unlocking behavior, user override settings, and the like. This accessed data is communicated to vehicle lock manager 104 to assist the vehicle lock manager in determining whether to unlock one or more vehicle doors. Further, vehicle lock manager 104 may communicate data, such as subsequent user door unlocking behavior, user profile changes, and user override changes to server 112 for storage in database 114. In some embodiments, vehicle lock manager 104 stores some or all of the data that is also stored in database 114.

In some embodiments, server 112 may provide other information to vehicle lock manager 104, such as weather information, online map information to identify stores or attractions near the current location of vehicle 102, and the like. In other implementations, vehicle lock manager 104 may communicate with other servers or data sources (not shown) via network 110. These other servers or data sources can provide any type of data from any number of data providers.

In the example embodiment 100 shown in FIG. 1, one vehicle access device 106 is shown accessing vehicle 102. In other embodiments, multiple vehicle access devices 106 are used to access the same vehicle 102. For example, two different users 108 may frequently drive vehicle 102. In this situation, each of the different users 108 have their own vehicle access device 106. Each vehicle access device 106 has its own unique code or identifier such that vehicle lock manager 104 can distinguish between the two vehicle access devices 106. Since each of the two users 108 may have different profile settings, user door unlocking behavior, and user override settings, vehicle lock manager 104 treats each vehicle access device 106 separately. Thus, vehicle lock manager 104 identifies a particular vehicle access device 106 that is approaching vehicle 102 and identifies specific user data associated with the identified vehicle access device 106. That specific user data is applied by vehicle lock manager 104 when determining which door(s) to unlock in vehicle 102, as discussed herein.

Figure 2:
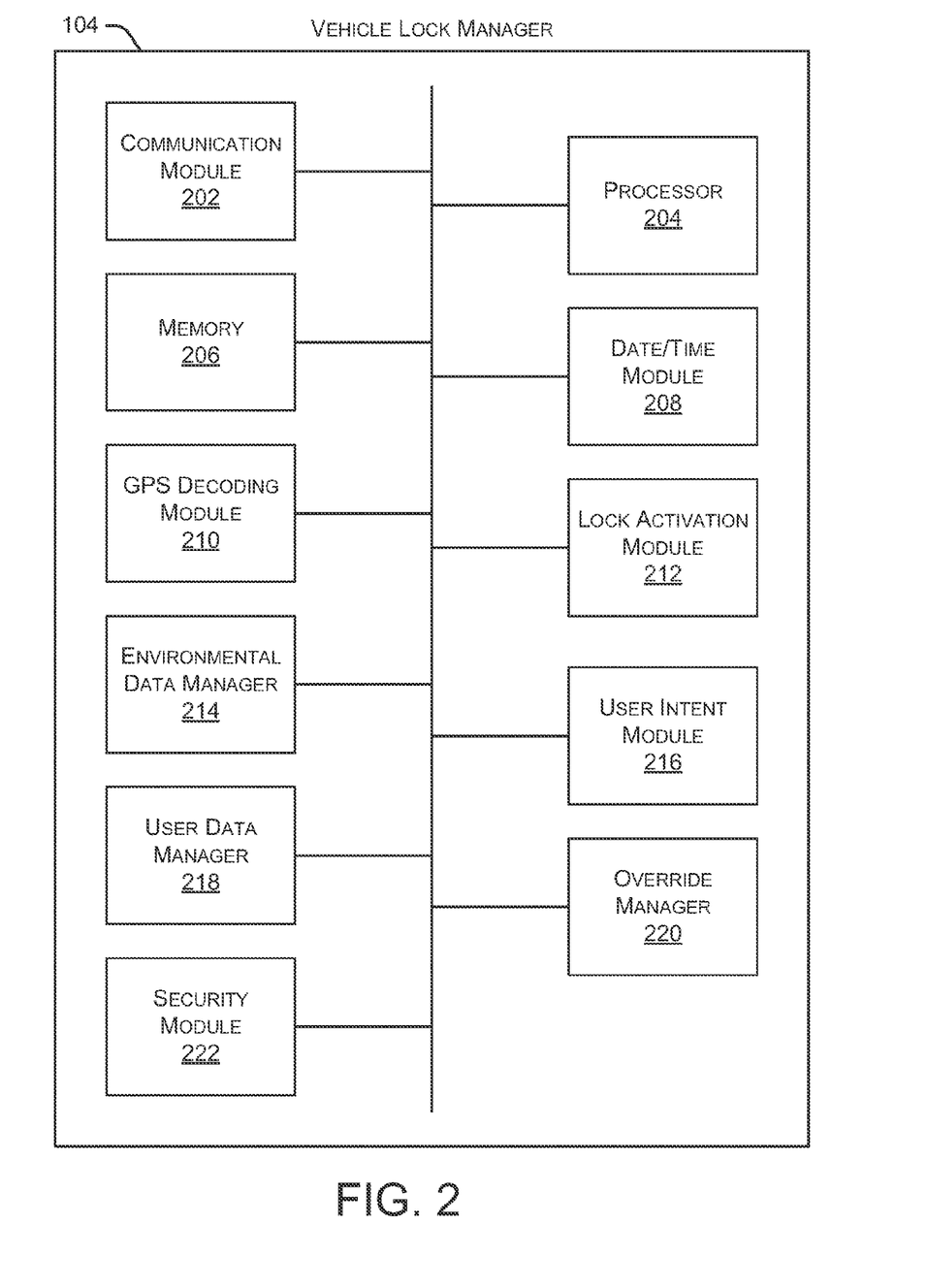
FIG. 2 is a block diagram depicting an embodiment of a vehicle lock manager.

FIG. 2 is a block diagram depicting an embodiment of vehicle lock manager 104. As shown in FIG. 2, vehicle lock manager 104 includes a communication manager 202, a processor 204, and a memory 206. Communication module 202 allows vehicle lock manager 104 to communicate with other systems or components, such as vehicle access device 106, network 110, server 112, and the like. Additionally, communication module 202 may communicate with other systems or devices in vehicle 102 via a bus, such as a CAN (controller area network) bus. Processor 204 executes various instructions to implement the functionality provided by vehicle lock manager 104. Processor 204 may include any type of general purpose or special purpose processor for executing program code or instructions. Memory 206 stores these instructions as well as other data used by processor 204 and other modules contained in vehicle lock manager 104. Additionally, memory 206 may store user-specific information, such as user profile information, previous user door unlocking behavior, user override settings, and the like.

Vehicle lock manager 104 also includes a date/time module 208 that maintains a current time, date, and day of the week. This time and date information is linked to specific user door unlocking activities and stored for future reference in determining the user's future door unlocking intent, as discussed herein. A GPS (global positioning system) decoding module 210 determines a current geographic location of a vehicle and links the geographic location data with user door unlocking activities for future reference in determining whether to unlock one or more vehicle doors for the user. A lock activation module 212 is connected to one or more lock mechanisms in vehicle 102 and is capable of sending lock instructions and unlock instructions to each lock mechanism in the vehicle. In some embodiments, lock activation module 212 can also determine when a user (with a vehicle access device 106) is approaching vehicle 102. In response to detecting a user within a predetermined distance of vehicle 102, lock activation module 212 may cause processor 204 to determine a user intent and, based on the user intent, determine whether to unlock any vehicle doors.

Vehicle lock manager 104 further includes an environmental data manager 214 that receives various environmental data (e.g., ambient light level, temperature, existence of precipitation, etc.) from one or more sensors in vehicle 102 or from other data sources, such as server 112, and the like. A user intent module 216 determines, based on previous user door unlocking behavior whether to unlock one or more doors in vehicle 102. Additional details regarding this determination are provided below. A user data manager 218 manages various user data, such as data associating a particular vehicle access device 106 with a user, user profile information, previous user door unlocking behavior, user override settings, and the like. An override manager 220 manages various activities associated with one or more user override settings, as discussed herein. In some embodiments, the user can update the override settings (and other user preferences) through a vehicle infotainment system or other user interface mechanism. Vehicle lock manager 104 also includes a security module 222 that prevents unauthorized users from unlocking vehicle doors or changing user settings. For example, security module 222 may verify a user ID or other unique identifier associated with vehicle access devices to authenticate the device (e.g., determine that the unique identifier associated with the vehicle access device is authorized to unlock one or more of the vehicle's doors).

Figure 3A:
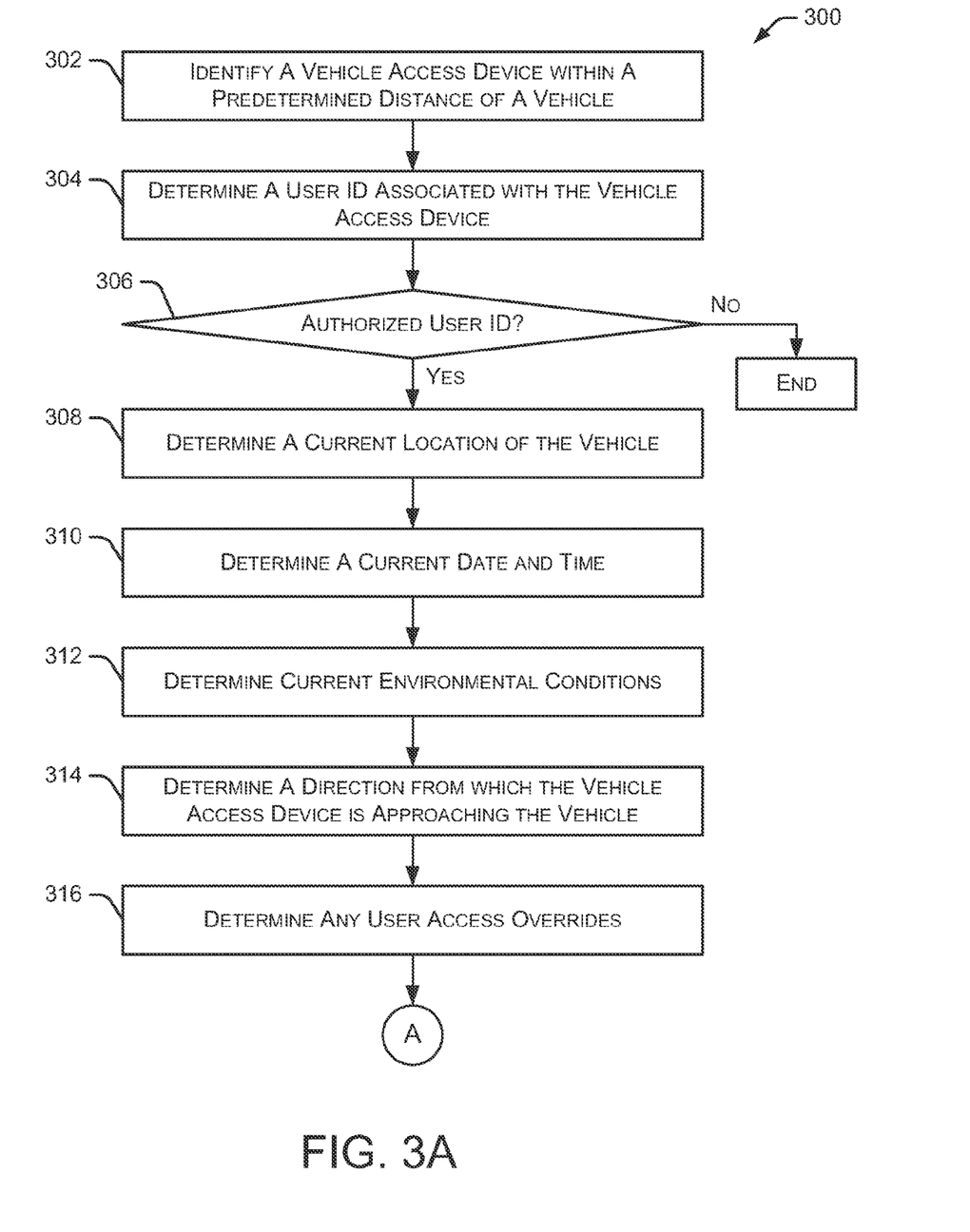
FIGS. 3A and 3B represent a flow diagram depicting an embodiment of a method for automatically unlocking one or more vehicle doors.
Figure 3B:
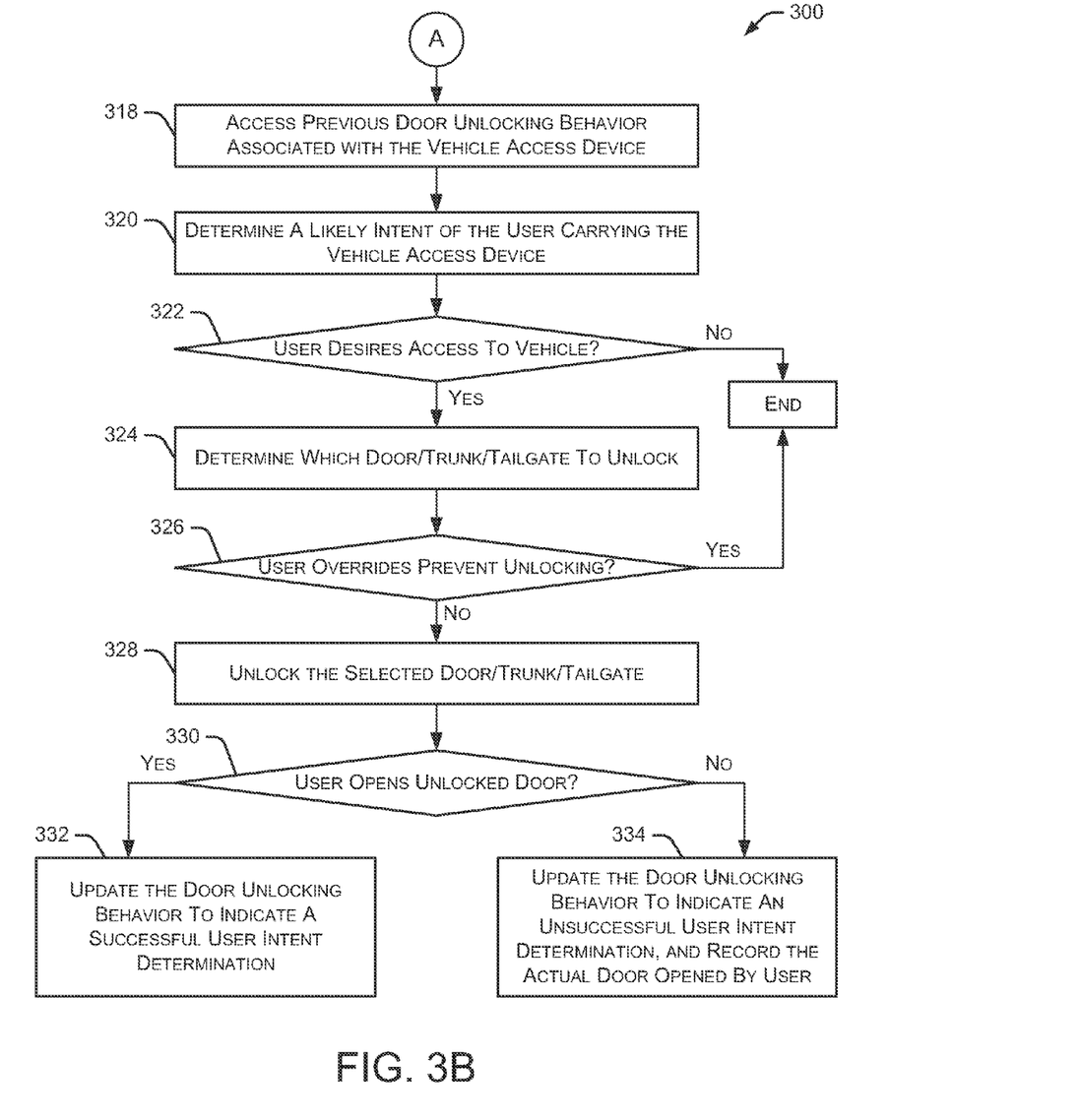

FIGS. 3A and 3B represent a flow diagram depicting an embodiment of a method 300 for automatically unlocking one or more vehicle doors. Initially, method 300 identifies a vehicle access device within a predetermined distance of a vehicle at 302. For example, the predetermined distance for identifying a vehicle access device may be 10 feet or 20 feet from the vehicle. The method continues by determining at 304 a user ID (or other unique identifier) associated with the vehicle access device and determining at 306 whether the user ID is authorized to unlock doors for the particular vehicle. For example, a particular vehicle may only accept door unlocking commands (and other instructions) from specific vehicle access devices, such as the vehicle access devices associated with the owners or drivers of the vehicle. If the user ID is not authorized, method 300 ends.

If the user ID is authorized, a current geographic location of the vehicle is determined at 308. In some embodiments, the current vehicle location is determined using a GPS device or other locating system. A current date and time is determined at 310 using, for example, date/time module 208 discussed herein. The method also determines current environmental conditions at 312, such as temperature, ambient light, precipitation conditions, and the like. In some embodiments, the method determines, at 314, a direction from which the vehicle access device is approaching the vehicle. For example, the method may determine whether the vehicle access device is approaching toward the back of the vehicle, the front of the vehicle, the driver's side of the vehicle or the passenger's side of the vehicle.

Method 300 also determines, at 316, any user access overrides, which defines particular door unlocking actions to take at certain times and/or in certain geographic locations. For example, a user (e.g., vehicle owner) may specify that the system should only unlock the driver's door in downtown locations or after dark. This user access override will be implemented regardless of the user intent predicted by the system. Thus, if the described systems and methods predict that the user will want the vehicle's trunk unlocked, but a user override indicates that only the driver's door should be unlocked, the system will only unlock the driver's door, thereby ignoring the predicted user intent that the vehicle trunk should be unlocked.

The method accesses previous door unlocking behavior at 318 associated with the vehicle access device. For example, data may be accessed from memory 206 in vehicle lock manager 104, from database 114 or from any other storage device. Method 300 determines, at 320, a likely intent of the user carrying the vehicle access device by considering a variety of data. The likely intent includes, for example, unlocking a trunk to put packages into the trunk, unlocking the driver's door for vehicle access, or unlocking both the driver's door and the rear driver's-side door to put a briefcase in the back seat and enter the driver's door. When determining the likely intent of the user, the method may consider any one or more of the following: previous door unlocking behavior by the user, current geographic location of the vehicle, time of day, day of the week, environmental conditions, and the direction from which the vehicle access device is approaching the vehicle. In particular embodiments, one or more machine learning or neural network algorithms are used to determine the probabilistic intent of the user and predict the vehicle door(s) to unlock.

If the method determines, at 322, that the user does not intend to access the vehicle, then the method ends. However, if the method determines that the user's likely intent is to access the vehicle, the method determines, at 324, which door, trunk or tailgate to unlock. This determination is made using various types of data, as discussed above. In some embodiments, the method determines that multiple doors, trunks and/or tailgates should be unlocked.

The method determines, at 326, whether any user overrides prevent unlocking of any doors, trunk or tailgate. If user overrides prevent the intended unlocking activity (as determined at 324), the method ends without unlocking any doors, trunk or tailgate. If there are no relevant user overrides, method 300 unlocks the selected door, trunk or tailgate at 328. As noted above, multiple doors, trunks and/or tailgates can be unlocked at the same time.

To obtain feedback on the accuracy of the predicted user intent, the described systems and methods determine whether a user opens the unlocked door(s) at 330. If the user opens an unlocked door, the method updates, at 332, the door unlocking behavior associated with the user to indicate a successful user intent determination. However, if the user does not open an unlocked door, the method updates, at 334, the door unlocking behavior associated with the user to indicate an unsuccessful user intent determination. The method also records the actual door opened by the user for use in making future user intent predictions.

In some embodiments, the system may ignore any vehicle access devices to prevent unintended unlocking of any vehicle doors. In certain geographic areas, the vehicle access device may be close to the vehicle, but the user is not actually approaching the vehicle. For example, when the vehicle is parked at the user's home, the vehicle access device may frequently move within a predetermined distance of the vehicle as the user walks around their house. But, the user is not approaching the vehicle and does not require any door unlocking activity.

In certain embodiments, the described systems and methods also calculate a certainty level associated with the predicted user intent. In these embodiments, the system only unlocks one or more vehicle doors if the certainty level exceeds a threshold value. The threshold value may be set by the user or determined from a default setting. In some embodiments, the certainty level changes depending on one or more factors, such as time of day, geographic location, and the like.

Figure 4A:
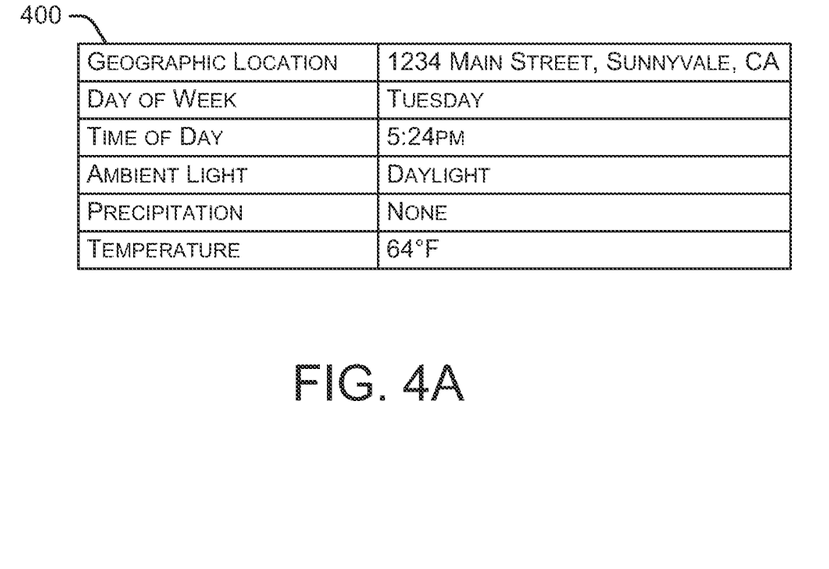
FIGS. 4A and 4B illustrate data associated with example scenarios that are analyzed by the described systems and methods to determine whether to unlock one or more vehicle doors.

FIGS. 4A and 4B illustrate data associated with example scenarios that are analyzed by the described systems and methods to determine whether to unlock one or more vehicle doors. In FIG. 4A, a first scenario defines a user walking toward a vehicle at 5:24 pm on a Tuesday. The vehicle is located close to a building where the user works. A table 400 illustrates data accessed by vehicle lock manager 104 and used to predict a user intent. In this situation, since it is a workday for the user, the vehicle is located near their place of work, and the time is approximately when the user typically leaves work, vehicle lock manager 104 determines that the user is leaving work. Vehicle lock manager 104 may also analyze previous user unlocking behavior to confirm this determination. Based on the determination that the user is leaving work, vehicle lock manager 104 reviews previous user unlocking behavior to determine that the user typically unlocks (or opens) the driver's door and the rear driver's-side door when leaving work (e.g., to put their briefcase on the back seat and enter the vehicle through the driver's door). Thus, in this scenario, the system automatically unlocks the driver's door and the rear driver's-side door as the user approaches the vehicle. By automatically unlocking the appropriate doors, the user can simply open the doors without having to find a key fob or other vehicle access device. Although table 400 includes data regarding ambient light, precipitation, and temperature, vehicle lock manager 104 may not need to use that data in this example to determine the user's intent.

Figure 4B:
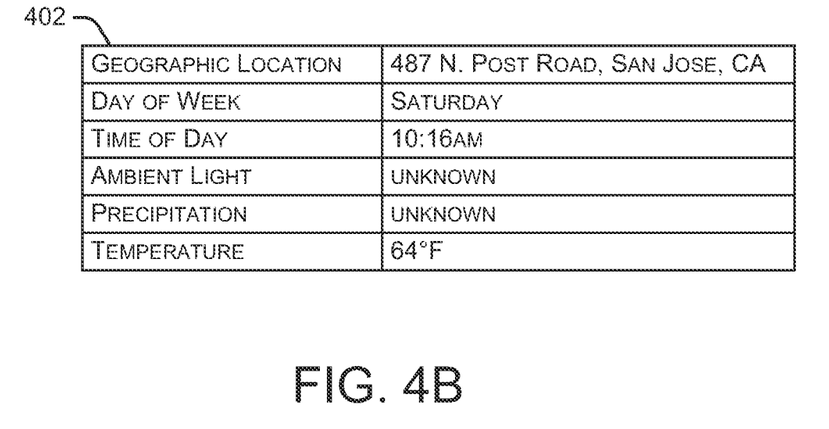

In FIG. 4B, a second scenario defines a user walking toward a vehicle at 10:16 am on a Saturday. The vehicle is located close to a grocery store where the user regularly shops. A table 402 illustrates data accessed by vehicle lock manager 104 and used to predict a user intent. In this situation, since it is a weekend day and the vehicle is located near a grocery store, vehicle lock manager 104 determines that the user is returning to their vehicle after shopping for groceries. Vehicle lock manager 104 may also analyze previous user unlocking behavior to confirm this determination (e.g., frequently shopping for groceries on Saturday mornings). Based on the determination that the user has been shopping for groceries, vehicle lock manager 104 reviews previous user unlocking behavior to determine that the user typically unlocks (or opens) the driver's door and the trunk (e.g., to put their groceries in the trunk and enter the vehicle through the driver's door). Thus, in this scenario, the system automatically unlocks the driver's door and the trunk as the user approaches the vehicle. By automatically unlocking the appropriate door and trunk, the user can simply open the door and lift the trunk without having to find a key fob or other vehicle access device. In some embodiments, when the trunk is unlocked, it opens automatically for the user and makes the trunk space immediately available for storing groceries. Although table 402 includes data regarding a current temperature, vehicle lock manager 104 may not need to use that data in this example to determine the user's intent. Additionally, in this example, vehicle lock manager 104 does not have access to ambient light or precipitation data, but can make a user intent determination without that data.

In some situations, vehicle lock manager 104 may automatically unlock a trunk but the user does not access the trunk. Depending on the trunk locking mechanism in a particular vehicle, the trunk may be at least partially opened when unlocked by vehicle lock manager 104. In this situation, vehicle lock manager 104, or another vehicle system, needs to alert the driver that the trunk is unlocked and not latched (e.g., not secured). Leaving the trunk unsecured while driving may impair vision or cause a loss of items stored in the trunk. A similar warning may be necessary with unlocked tailgates and other vehicle access points. In some embodiments, if the vehicle has a mechanism to automatically lock the trunk (or close a door/hatch), then the vehicle lock manager can automatically lock the trunk when the driver is in the vehicle's driver seat and ready to drive the vehicle.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   detecting a vehicle access device within a predetermined distance of a vehicle;
   determining a geographic location of the vehicle;
   detecting a time of day;
   determining previous door unlocking behavior associated with the vehicle access device;
   selecting, using one or more processors, a vehicle access point to unlock based on the geographic location, time of day, and previous door unlocking behavior;
   unlocking the selected vehicle access point;
   determining whether the user opened the selected vehicle access point; and
   updating the door unlocking behavior associated with the vehicle access device based on whether the user opened the selected vehicle access point.

2. The method of claim 1, further comprising detecting a day of the week, wherein selecting a vehicle access point to unlock is further based on the day of the week.

3. The method of claim 2, further comprising selecting multiple vehicle access point to unlock based on the geographic location, time of day, day of the week, and previous door unlocking behavior.

4. The method of claim 1, further comprising preventing unlocking of the selected vehicle access point if a user override contradicts unlocking of the selected vehicle access point.

5. The method of claim 1, further comprising determining a direction from which the vehicle access device is approaching the vehicle, wherein selecting a vehicle access point to unlock is further based on the direction from which the vehicle access device is approaching the vehicle.

6. The method of claim 5, further comprising predicting an intent of a user carrying the vehicle access device based on the geographic location, time of day, previous door unlocking behavior, and direction from which the vehicle access device is approaching the vehicle.

7. The method of claim 1, wherein the vehicle access device is one of a key fob, a smartphone, a portable computing device, a tablet computer, and a smart watch.

8. The method of claim 1, further comprising automatically opening the selected vehicle access point subsequent to unlocking the selected access point.

9. A method comprising:
   detecting a vehicle access device within a predetermined distance of a vehicle;
   determining a geographic location of the vehicle;
   detecting a time of day;
   determining previous door unlocking behavior associated with the vehicle access device;
   selecting, using one or more processors, a vehicle access point to unlock based on the geographic location, time of day, and previous door unlocking behavior; and
   detecting an environmental condition proximate the vehicle, wherein selecting a vehicle access point to unlock is further based on the environmental condition.

10. The method of claim 9, wherein the environmental condition includes at least one of a temperature, an ambient light level, and a precipitation condition.

11. The method of claim 1, wherein the vehicle access point is one of a vehicle door, a trunk, a tailgate, a sliding door, a hatch, a hood, and a gas tank refill door.

12. An apparatus comprising:
   a vehicle access device;
   a vehicle lock manager forming part of a vehicle and configured to communicate with the vehicle access device and detect the presence of the vehicle access device within a predetermined distance of the vehicle, the vehicle lock manager comprising a processing device programmed to:
      detect a vehicle access device within a predetermined distance of the vehicle;
      determine a geographic location of the vehicle;
      detect a time of day;
      determine previous door unlocking behavior associated with the vehicle access device;
      select a vehicle access point to unlock based on the geographic location, time of day, and previous door unlocking behavior;
      unlock the selected vehicle access point;
      determine whether the user opened the selected vehicle access point; and
      update the door unlocking behavior associated with the vehicle access device based on whether the user opened the selected vehicle access point.

13. The apparatus of claim 12, further comprising an override manager configured to prevent unlocking of the at least one vehicle access point.

14. The apparatus of claim 12, further comprising an environmental data manager configured to access data associated with environmental conditions proximate the vehicle.

15. A vehicle comprising:
   a plurality of doors, each of the plurality of doors having an associated door lock; and
   a vehicle lock manager coupled to the door locks associated with the plurality of doors, the vehicle lock manager configured to communicate with a vehicle access device, the vehicle lock manager including a processing device programmed to:
      detect a vehicle access device within a predetermined distance of the vehicle;
      determine a geographic location of the vehicle;
      detect a time of day;
      determine previous door unlocking behavior associated with the vehicle access device;
      select a vehicle access point to unlock based on the geographic location, time of day, and previous door unlocking behavior;
      unlock the selected vehicle access point;
      determine whether the user opened the selected vehicle access point; and
      update the door unlocking behavior associated with the vehicle access device based on whether the user opened the selected vehicle access point.

16. The vehicle of claim 15, the vehicle lock manager further comprising an override manager configured to prevent unlocking of the at least one vehicle door.

* * * * *